Oct. 11, 1932.  C. L. FINLAY  1,882,132
COLOR PHOTOGRAPHY
Filed Jan. 10, 1930
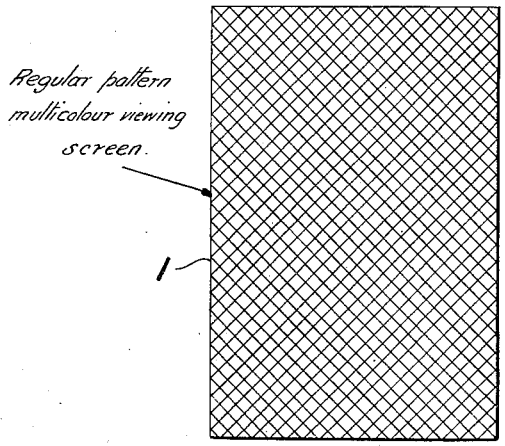
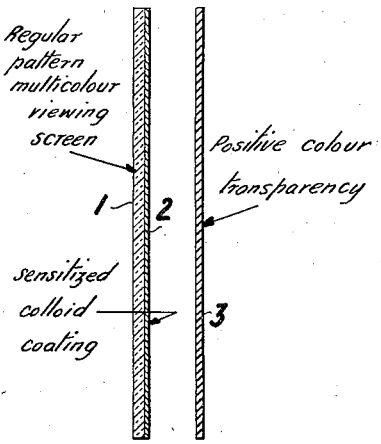
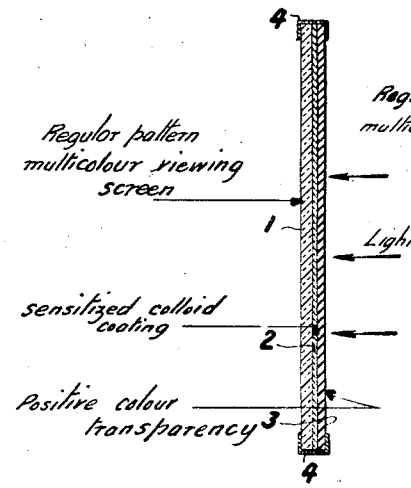
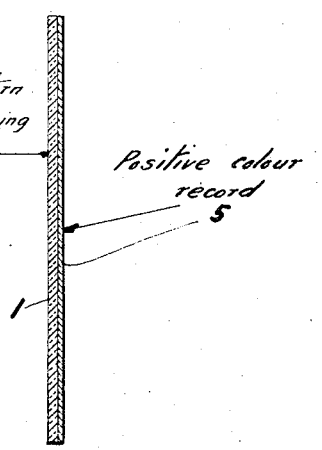
Inventor
CLARE L. FINLAY Patented Oct. 11, 1932

1,882,132

UNITED STATES PATENT OFFICE

CLARE LIVINGSTONE FINLAY, OF SLOUGH, ENGLAND

COLOR PHOTOGRAPHY

Application filed January 10, 1930, Serial No. 420,017, and in Great Britain February 9, 1929.

The chief objection to the separate or duplicating method of color photography, according to which a color transparency consisting of a black and white positive, made from a black and white color negative, is held in contact with a regular pattern multicolor viewing screen, is due to the parallax effect produced when viewing the color transparency sideways, which causes alterations in color.

The present invention has for its object to avoid this objection without in any way affecting the ability to obtain duplication of results from one original negative.

It has also for its object to enable color positives to be produced without the aid of registering devices.

It also has for its object to enable color positives to be obtained without the use of a silver emulsion photographic plate for each duplicate result and thus to cheapen the production of color positives.

The method of attaining the above mentioned objects will now be described with the aid of the accompanying illustrative drawing wherein Fig. 1 shows in front elevation a multi-color regular pattern viewing screen. Fig. 2 shows, in vertical section, the viewing screen with a sensitized colloid coating on its rear side and also separated therefrom, a positive color transparency. Fig. 3 shows in vertical section, the positive transparency in close contact with the sensitized colloid coating on the viewing screen. Fig. 4 represents the viewing screen upon which a neutral black and white positive color record has been produced according to the invention. The size of the pattern on the viewing screen and the thickness of the sensitized colloid coating and of the neutral black and white color record on the screen, are as will readily be understood, greatly exaggerated, for the sake of clearness.

For carrying out the invention, a multicolor regular pattern viewing screen 1 which may be of any recognized commercial regular pattern, is provided on one side with a coating 2 of a colloid and allowed to dry. The coating may, in practice, be the ordinary protective coating on the screen, in which case no other coating is necessary. The coating is then sensitized, as for instance by placing it in a solution of an alkaline bichromate. A suitable solution for the purpose can be prepared by dissolving one ounce of potassium bichromate in twenty ounces of water and adding ammonia of 880 strength until the solution turns lemon color. The regular pattern multicolor viewing screen thus sensitized is then allowed to dry in the dark and when dry is registered upon a positive transparency 3 in the usual manner of making a transparency by duplicating methods of color screen photography, the sensitized coating being arranged adjacent to the transparency (Fig. 3). The registration should be done in subdued daylight or ordinary artificial illumination. The positive transparency and the sensitized coated screen registered upon it in correct color relationship, are firmly held together, as by clips 4, and exposed to daylight or strong artificial light for a suitable time with the positive transparency 3 facing the light, after which the screen is separated from the positive transparency and put into a dish of cold water. After soaking for a few minutes, it is placed in a solution of a dye or dyes that will give a natural black image and which will take to the colloid coating in such manner that where the printing light has had full effect, no dye will be absorbed but where the light has had less or no effect, the dye will be absorbed proportionately to such light effect, that is to say, so that a positive effect will result from a positive, and not a positive from a negative, as is usual in most photographic processes. The screen with the neutral black image thereon is then removed from the dyeing bath, washed clear and dried. The result of this operation is that a positive 5 in correct colors and in intimate contact with the screen, is obtained without any parallax effect being produced. Nigrosine is a suitable black dye for use as above described, but as the various kinds of such dye as are available, differ, as to the neutrality of the black, it may be necessary to modify it by the addition thereto of another dye or dyes of a similar character, that is to say, a dye that will give a positive image from a positive transparency and enable a neutral black image to be produced. For instance, should the image produced by any nigrosine used be of a brownish shade, this effect may be neutralized or modified by the addition to the black dye of a small amount of a blue dye of a similar character. Or should the image produced by any nigrosine used be of a blue black shade, this effect may be neutralized or modified by the addition to the black dye of a small amount of a brown dye of a similar character.

By the method described, not only is parallax entirely eliminated, but correct registration of the viewing screen 1 and companion color positive 5 (Fig. 4) thereon is effected without the aid of registering devices because the original positive transparency and the sensitized screen are registered in their natural colors in a recognized manner, whereas were it necessary to use a negative plate to produce a positive transparency on the viewing screen, it would be necessary to register the viewing screen and negative in complementary colors, which is a difficult and uncertain process. Furthermore, the need for using a separate silver emulsion photographic plate for each duplicate combined viewing screen and color positive produced, as heretofore, is avoided. As a result, color positives of greatly improved quality can be produced in an economical manner.

What I claim is:—

1. A method of producing a combined regular pattern multicolor viewing screen and black and white positive color image or transparency in intimate optical contact therewith, said method consisting in exposing a viewing screen having thereon a colloid film or coating sensitized by a bichromate to light through a positive color transparency, removing the said transparency from the combined viewing screen and exposed film or coating and subjecting the latter, in a moistened condition, to the action of a solution of a dye material that will have no effect on those portions of the exposed film or coating where the printing light has had full effect thereon but will produce on the film or coating where the light has had less or no effect thereon, a neutral black image constituting a positive color transparency corresponding to the originating positive color transparency and washing and drying the said viewing screen and positive color transparency thereon.

2. A method of producing a combined regular pattern multicolor viewing screen and black and white positive color transparency in intimate optical contact therewith, said method consisting in providing one side of the viewing screen with a colloid coating, sensitizing the said coating with a solution of a bichromate, registering the viewing screen with sensitized coating upon a positive color transparency, exposing the viewing screen and sensitized coating to light through said positive color transparency, removing the combined viewing screen and exposed coating from the color transparency, moistening the exposed coating, subjecting the latter to the action of a solution of dye material that will have no effect on that portion of the exposed coating where the printing light has had full effect but will produce on the coating where the light has had less or no effect thereon, a neutral black image constituting a positive color transparency corresponding to the originating positive color transparency and washing and drying the said viewing screen and positive color transparency thereon.

3. In the method of producing a combined regular pattern multicolor viewing screen and positive color transparency in intimate contact therewith according to claim 2, using as the dye material, a solution of nigrosine.

4. In the method of producing a combined regular pattern multicolor viewing screen and positive color transparency in intimate optical contact therewith according to claim 2, using as the dye material a solution of nigrosine and another dye of a similar character, to ensure the production on the viewing screen of a positive color transparency consisting of a neutral black image.

5. A method of producing a combined regular pattern multicolor viewing screen and positive color image or transparency thereon, said method consisting in providing a regular pattern viewing screen, on one side thereof, with a colloid coating, sensitizing the coating with a solution of an alkaline bichromate, registering the viewing screen with the sensitizing coating thereon in correct color relationship with a positive transparency arranged adjacent to the sensitized coating, exposing the combined viewing screen, sensitized coating and color transparency to light, separating the viewing screen with light acted upon coating thereon from the color transparency and immersing it in water to soak the coating, immersing the screen with its coating in a solution of a dye material that will produce a neutral black image on the coating where the light has produced little or no effect thereon but will have no effect on the portion of the coating upon which light has had full effect, and afterwards removing the screen with positive color image or transparency thereon from the dyeing solution, and washing and drying it.

6. As a new article of manufacture, a regular pattern multicolor viewing screen having in intimate optical contact therewith a black and white positive color record carried by a bichromated colloid film or coating.

Signed at London, England, this twenty-sixth day of November, 1929.

CLARE LIVINGSTONE FINLAY.